2,628,302

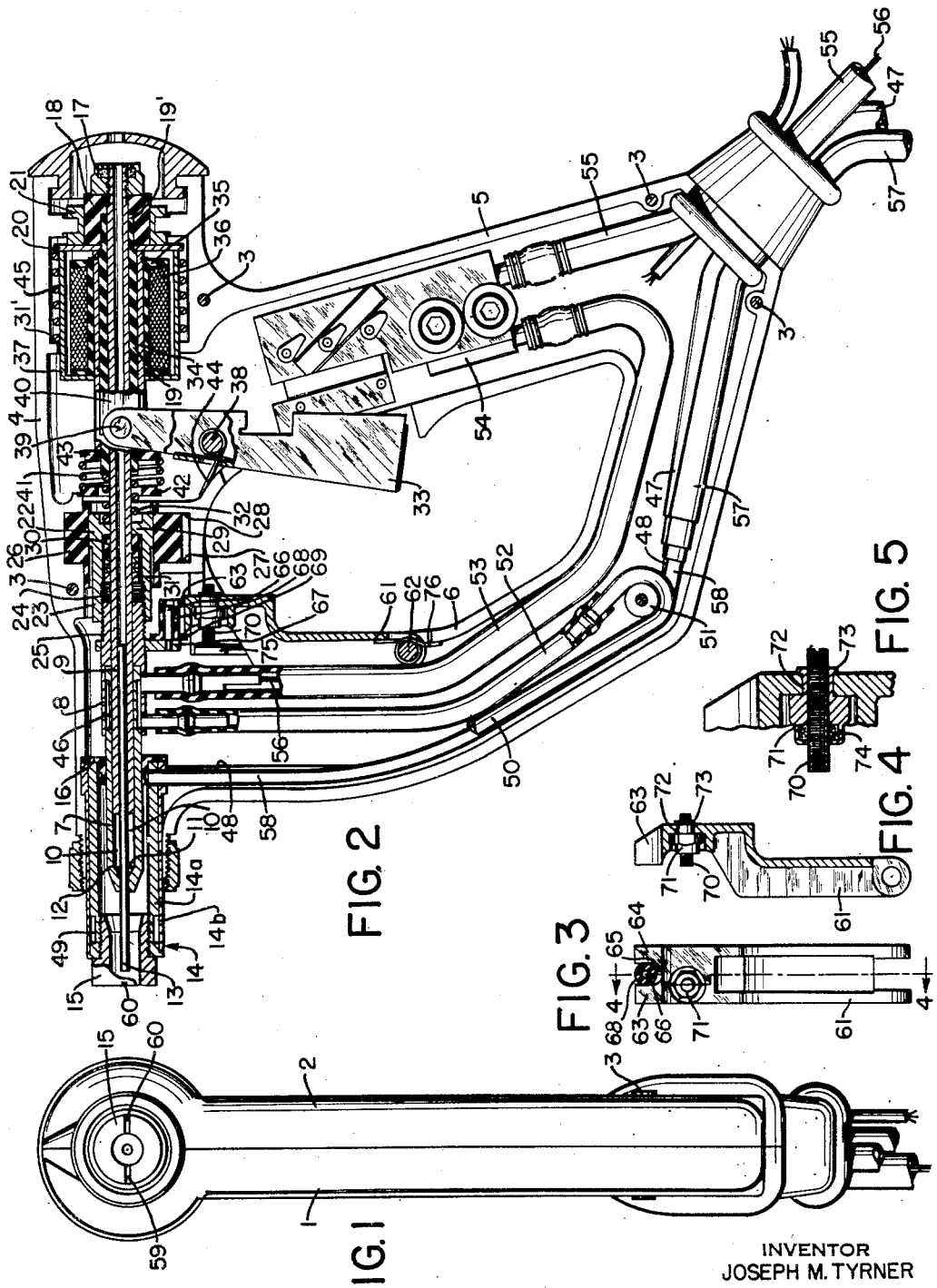
Feb. 10, 1953          J. M. TYRNER          2,628,302
ARC WELDING APPARATUS
Filed March 22, 1951
INVENTOR
JOSEPH M. TYRNER
BY
ATTORNEYS Patented Feb. 10, 1953

UNITED STATES PATENT OFFICE 2,628,302

ARC WELDING APPARATUS

Joseph M. Tyrner, Brookside, N. J., assignor to Air Reduction Company, Incorporated, New York, N. Y., a corporation of New York Application March 22, 1951, Serial No. 216,935

9 Claims. (Cl. 219—15)

This invention relates to arc welding apparatus and more particularly to portable apparatus by which arc spot welding may be performed.

The copending application of Nelson E. Anderson, Serial No. 41,527, filed July 30, 1948, now U. S. Patent 2,586,140, granted February 19, 1952, and assigned to the same assignee as the present application, discloses and claims an arc welding gun having a barrel, and a pistol grip provided with a trigger, and means operating when the trigger is pulled for advancing an electrode holder in the barrel to bring the end of a non-consuming electrode gripped in the holder into contact with the work. Means are further provided for automatically retracting the electrode holder to the limit of its rearward movement as soon as the electrode touches the work to thereby establish the welding arc. The end of the barrel has a nozzle attached to it through which an inert shielding gas such as argon or helium is discharged to shield the tip of the electrode, the arc, and the weld puddle. The end of the nozzle is held against the work at the place where a spot weld is desired and the trigger is then pulled to initiate the sequence of operations which produce the weld. The length of the arc depends, of course, on the size of the gap between the end of the electrode and the work during the welding operation, and since the nozzle is held against the work during the welding interval the size of the gap will depend upon the distance that the electrode holder moves when retracted to establish the arc and on the distance that the electrode projects from the end of the electrode holder. The first condition usually remains constant since the welding gun has stop means which limits the rearward movement of the electrode holder so that it always moves a fixed distance when retracted to establish the arc. The other condition is a variable one since the electrode, which is usually made of tungsten, carbon, or thoriated tungsten, and which is non-consuming in the sense that it does not deposit metal in the weld, does nevertheless gradually become shorter during use and therefore reduces the distance that the electrode projects from the electrode holder. This, of course, results in an undesirable lengthening of the arc gap during welding which necessitates an adjustment of the electrode in the electrode holder.

It has been the custom when using arc welding apparatus of the kind above described to adjust the electrode in the electrode holder to obtain an arc gap of the desired length by making use of a special gauge usually consisting of a small block with an adjustable screw projecting upwardly from it. The gauge is placed on the work while the work is in a horizontal position and the welding gun is held against the work with the nozzle over the gauge and with the screw projecting up into the nozzle. Then while the electrode holder is in its fully retracted position the grip on the electrode is released and the electrode is adjusted in the holder until it makes contact with the end of the screw after which the grip of the electrode holder on the electrode is restored. Thus the electrode is repositioned in the electrode holder to make the size of the arc gap during the welding operation equal to the height of the gauge which in turn may be varied as desired by adjusting the screw on the block.

One objection to this method of adjusting the electrode in the electrode holder is that the gauge that must be used, whether it be of the particular kind above described or of some other kind, constitutes an extra piece of equipment and may not always be available when the operator needs it.

The principal object of this invention is to provide an arc spot welding gun, or other type of arc welding apparatus, having built-in means which facilitates the positioning of the electrode in the electrode holder to produce an arc gap of any desired length.

In the preferred form of the invention the built-in means for accomplishing this comprises a pivoted lever or auxiliary trigger which when manually moved in one direction moves a fixed distance depending upon the adjustment of a stop which limits its movement in that direction. This auxiliary trigger when moved in the direction of the stop advances the electrode holder a definite amount depending upon the adjustment of the stop. The auxiliary trigger is manually operable independently of the main trigger or other means employed for advancing the electrode holder to bring the electrode into contact with the work at the start of a welding operation, and independently of the means for retracting the electrode holder to establish the arc. The above-mentioned stop is adjusted so that the forward movement imparted to the electrode holder when the auxiliary trigger is moved against the stop is equal to the desired length of the arc gap during the welding operation. It will thus be seen that if the nozzle of the gun is held against the work when the gun is in a vertical position and the auxiliary trigger is operated to move the electrode holder forwardly a predetermined amount from its retracted position determined by the adjustment of the stop, and if the electrode holder's grip on the electrode is released to permit the electrode to slide down into contact with the work and the grip on the electrode then restored, the distance from the end of the electrode to the work when the electrode holder moves back to its retracted position will be equal to the distance that the electrode holder was advanced from its retracted position by operation of the auxiliary trigger and hence the arc gap will have the desired length determined by the setting of the stop for the auxiliary trigger.

A welding gun embodying the invention is illustrated in the accompanying drawing, in which:

Figure 1 is an end elevation of the gun looking toward the nozzle end thereof,

Fig. 2 is a side elevation of the gun with the nearest half of the casing removed to expose the interior parts, the interior parts being shown partly in vertical section and partly in side elevation, Fig. 3 is an elevation of the auxiliary trigger as it appears looking toward the nozzle end of the welding gun, and shows in section a pin and its insulating cover which are supported by the electrode holder and which are straddled by the upper end of the trigger, Fig. 4 is a longitudinal section through the auxiliary trigger taken on the line 4—4 of Fig. 3, and Fig. 5 is an enlarged vertical section through the stop screw and its bushing on the auxiliary trigger.

The welding gun may comprise a casing which is divided longitudinally to form two casing halves shown at 1 and 2 in Fig. 1. These halves are secured together by means of screws 3. The casing then forms a barrel portion 4, a pistol grip portion 5, and a hollow branch portion 6 through which the cooling water and gas conduits and the welding conductor pass as hereinafter described. It will be understood that in Fig. 2 the nearest half of the casing has been removed to expose the interior parts of the welding gun.

The electrode holder is mounted to slide in the barrel 4 and comprises an outer tube made up of forward and rear sections 7 and 8 and an inner electrode carrier tube 9 having limited sliding movement relative to the outer tube and the forward end of which is slotted longitudinally throughout a short distance to form a number of resilient electrode gripping jaws 10. The forward ends of these jaws are externally beveled as shown at 11 and cooperate with an internal conical surface 12 near the forward end of the section 7 of the outer tube such that when the two tubes are relatively moved into greater telescoping relation the resilient jaws 10 are forced inwardly into gripping engagement with a non-consuming electrode 13 of tungsten or the like carried by the inner tube, and when the two tubes are relatively moved in the opposite direction the grip of the resilient jaws on the electrode is released. Thus the forward end of the outer tube and the resilient jaws on the inner tube constitute a chuck for gripping the electrode. The means for relatively moving the inner and outer tubes to grip and release the electrode will be described later.

At its forward end the electrode holder projects into a nozzle 14 stationarily mounted in the gun casing. Screwed into the forward end of the nozzle 14 there is a removable and replaceable nozzle tip or work-contacting member 15 which constitutes in effect a continuation of the nozzle.

A bushing 16 made of electric insulating material located at the rear end of the nozzle forms a slide bearing for the outer tube 7—8 of the electrode holder and also provides a gas seal at the rear end of the nozzle. The electrode carrier tube 9 projects rearwardly out of the outer tube 7—8 and is threaded at its rear end to receive an elastic stop nut 17. This nut retains an insulating bushing 18 on the end of the tube 9. A sleeve 19 made of insulating material is slidably mounted on the rear portion of the tube 9, and has a portion 19' of reduced diameter at its rear end which partly telescopes within the bushing 18 as shown. A disc 20 of magnetic material has a slide fit on the portion 19' of the sleeve 19 and in the normal position of the parts abuts at one side against the forward face of the bushing 18 and at its other side against the shoulder existing on the sleeve 19 by reason of the provision of the reduced-diameter portion 19'. The bushing 18 slides in a bearing sleeve 21 held stationary by the gun casing.

The means for relatively moving the inner and outer tubes of the electrode holder to operate the chuck to grip or release the electrode includes a chuck-operating nut 22 having a forwardly extending sleeve portion 23 which is internally threaded as shown at 24. These internal threads cooperate with external threads 25 on the rear end of the section 8 of the outer tube. The nut 22 is slidable within the central opening of a knurled knob 26 made of insulating material, the nut being splined in the knob so that when the knob is turned rotation will also be imparted to the nut. The splining may be effected by giving the nut a square or other irregular cross-section and shaping the central opening in the knob 26 accordingly. The knob 26 is held against all movement, except rotary movement, by shoulders 27 and 28 on the gun casing. The knob projects through openings in the side walls of the gun casing so that it may be turned by hand. The nut 22 has a portion 29 which projects radially inward toward the inner tube 9 of the electrode holder. When the nut 22 is turned in a clockwise direction by the knob 26 the radially extending portion 29 on the nut exerts a forward pressure against the tube 9 through a rubber sleeve 30 and a nut or shoulder 31 fixedly carried by the tube 9. This tends to retract the outer tube 7—8 of the electrode holder and tends to move the inner tube 9 of the holder forwardly thus causing the conical surface 12 in the outer tube to have a cam action on the beveled ends of the resilient jaws 10 which forces the resilient jaws inwardly to grip the electrode. When the nut 22 is turned in the opposite direction by the knob 26 pressure is exerted on the outer tube 7—8 of the electrode holder in a forward direction, and on the inner tube 9 in a rearward direction through a coil spring 32 located between the nut 22 and the forward end of the insulating sleeve 19. Thus, rotation of the knob 26 in this direction permits the resilient jaws 10 to release their grip on the electrode. The principal function of the coil spring 32 will be described later.

With the electrode properly gripped in the electrode holder, and with the nozzle tip held against the work, the electrode holder is advanced to bring the electrode into contact with the work by pulling a main trigger 33. A brief interval after the electrode touches the work the electrode holder is automatically retracted to establish the arc. The particular means employed whereby the electrode holder is advanced when the trigger is pulled, and the particular means used for automatically retracting the electrode holder to establish the arc, form no part of the present invention and these functions may be performed in any suitable way. The particular advancing and retracting means for the electrode holder shown in the accompanying drawing are of the kind disclosed and claimed in the copending application of Nelson E. Anderson, Serial No. 216,961, filed March 22, 1951, assigned to the same assignee as the present application and includes an electro-magnetic coupling of the kind now to be described.

Slidably mounted on the insulating sleeve 19 is a metal sleeve 34 to which there is secured a spool 35 of insulating material. This spool has wound on it a coil of insulated wire 36. A casing or housing 37 secured to the metal sleeve 34 encloses the wire coil 36. The coil housing 37 is open at its rear end except when in abutting relation with the disc 20. These parts, i. e., the metal sleeve 34, spool 35, coil 36, and coil housing 37, constitute a so-called coil assembly. Energization of the coil 36 produces a magnetic field which causes the disc 20, then acting as an armature, to move forwardly with the coil assembly when the coil assembly is moved forward by the trigger 33 as hereinafter described, and the forward movement of the armature 20 advances the electrode holder in a manner also to be later described.

The trigger 33 is pivoted intermediate its ends in the casing at 38. Thus, as the lower end of the trigger is pulled, i. e., moved to the right in Fig. 2, the upper end moves to the left or in a forward direction. The trigger is bifurcated at its upper end to straddle the sleeve 34 of the coil assembly and each of the straddling arms has a pin 39 which projects inwardly into a flat 40 formed in the side of the sleeve 34. When the trigger is pulled, each of the two pins 39 engages the shoulder existing at the forward terminus of the corresponding flat 40 and hence the upper end of the trigger in moving forwardly moves with it the entire coil assembly. This movement of the coil assembly is in opposition to the action of a return spring 41 which biases the coil assembly to its normal position shown in the drawing. The spring 41 bears at its forward end against a retainer ring 42 held in fixed position by the gun casing, and at its rear end against retainer ring 43 which abuts against the forward end of the sleeve 34 of the coil assembly. A spring 44 yieldingly maintains the trigger 33 in its normal position, i. e., the position shown in the drawing.

It is not necessary for an understanding of the present invention to have full knowledge of the electric circuits, relays and other instrumentalities used with the gun. These are all fully disclosed in the last-mentioned copending application No. 216,961 of Nelson E. Anderson. It is sufficient for the present purpose to know that when the welding generator is in operation and under open circuit conditions the coil 36 of the electro-magnetic coupling is energized and therefore when the coil assembly 34—37 is moved forwardly by pulling the trigger the disc or armature 20, now being magnetically attracted to the coil assembly by the magnetic field produced by the coil, is caused to move forwardly along with the coil assembly. The armature 20 moves along with it the insulating sleeve 19 and this sleeve through the spring 32 moves the chuck-operating nut 22 which in turn moves the outer tube 7—8 of the electrode holder. The nut 22 also moves the electrode carrier tube 9 through the rubber sleeve 30 and shoulder 31 on this tube. Thus, the electrode carrier tube 9 and bushing 18 at its rear end are now moving in unison with the insulating sleeve 19 and the armature 20 and all of the parts except the bearing 21 move together. During this movement of the parts the bushing 18 slides in the bearing 21. When the electrode touches the work the coil 36 of the electro-magnetic coupling is automatically de-energized thus permitting a coil spring 45, which surrounds the coil housing 37 and which bears at its rear end against the armature disc 20 and at its forward end against a shoulder 31' on the gun casing, to return the armature to normal position. This retracts the electrode holder and establishes the arc because in moving rearwardly the armature disc 20 moves with it the bushing 18, nut 17, and the electrode carrier tube 9. The shoulder 31 on the electrode carrier tube, the rubber sleeve 30, and the chuck-operating nut 22, cause the outer tube 7—8 of the electrode holder to move rearwardly with the electrode carrier tube.

When the electrode holder is advanced to establish the arc there is a brief interval of time after the electrode touches the work before the relays in the electric circuit have time to function and cause retraction of the electrode holder. If the operator continues to pull on the trigger 33 during this interval of time then if it were not for the spring 32 the further advancement of the armature 19 by the electro-magnetic coupling and a continued pressure of the electrode against the work would be likely to push the gun back thus moving the nozzle tip 15 out of contact with the work, or the continued forward movement of the outer tube 7—8 of the electrode holder while the electrode is held stationary would be likely to shift the point at which the resilient jaws 10 grip the electrode. However, during this brief interval of time while the electrode is in contact with the work the spring 32 yields if the operator continues to pull on the trigger thus allowing continued movement of the coil assembly, armature 20 and insulating sleeve 19, while the electrode and the two tubes of the electrode holder remain stationary, the insulating sleeve 19 then sliding on and relative to the electrode carrier tube 9. When the armature 20 is released from the coil assembly by de-energization of the coil 36 and moves to its rearward position to establish the arc, as above described, the spring 32 returns the sleeve 19 to its rearward position. When the trigger is released the spring 41 returns the coil assembly to its rearward position and during this movement of the coil assembly the tube 34 thereof slides on the insulating sleeve 19.

The forward end portion of the rear section 8 of the outer tube of the electrode holder telescopes over the rear end portion of the forward section of this tube, and the portion of the forward section that lies within the rear section is provided with an annular recess 46 which forms a cooling chamber. Cooling water is supplied to the welding gun by means of a hose 47 which is connected to a tube 48 that extends through the branch portion 6 of the gun casing to the rear end of the nozzle 14. The nozzle is made up of an inner tube 14a and an outer sleeve 14b, the inner tube having on its outer surface a pair of longitudinally extending diametrically opposite flats (which do not appear in the drawing because of the plane in which the section of Fig. 2 is taken).

These flats form with the outer sleeve 14b two longitudinal water passages which are placed in communication at the forward end of the nozzle by an annular recess 49 also formed in the outer surface of the inner tube 14a and which is covered by the outer sleeve 14b. Water is admitted by the tube 48 to the rear end of one of the longitudinal passages and flows forwardly, then around the annular passage 49, and back through the other longitudinal passage from which it is discharged into a tube 50. This tube bends around a stud 51 and then connects with a flexible hose 52 which conducts the water to the above-described cooling chamber 46 on the electrode holder. The water leaves this chamber through a flexible hose 53 which conducts it to a junction box, and a flexible hose 55 leading from this junction box discharges the water from the welding gun. The conductor 56 for the welding current, preferably in the form of a metal braid, may pass through the water exit hoses 55 and 53 to the place where it is connected to the electrode holder. The reason for conducting the cooling water from the nozzle 14 to the cooling chamber 46 in the electrode holder by a conduit that extends down to and around the stud 51 is to provide a flexible portion of considerable length in this conduit (the hose 52) which along with the flexible hose 53 permits the necessary movement of the electrode holder in the gun barrel.

Shielding gas is supplied to the welding gun through a hose 57 which is connected to a tube 58 that extends through the branch 6 of the gun casing and opens into the nozzle 14. When the nozzle tip 15 is in contact with the work the gas is discharged from the nozzle to the atmosphere through recesses 59 and 60 (Fig. 1) in the work-contacting face of the nozzle tip.

In the retracted position of the electrode holder the armature disc 20 abuts against the fixed bearing sleeve 21. This bearing sleeve therefore constitutes a stop which definitely fixes the amount that the electrode holder can move rearwardly. It is evident that when the electrode holder is in its retracted position during welding and when the nozzle tip 15 is in contact with the work, the length of the arc gap will depend upon how far the electrode projects from the end of the electrode holder. As the electrode gradually shortens, there is an undesirable lengthening of the arc gap. The means now to be described is the means provided in accordance with the present invention to facilitate the repositioning of the electrode in the electrode holder to restore the arc gap to its desired length.

Pivotally mounted in the branch 6 of the gun casing is a lever or auxiliary trigger 61 shown by itself in Figs. 3 and 4. It is preferably pivoted at its lower end on a pin or shaft 62 mounted in the casing. The upper end of the trigger engages the electrode holder in such a way that when the auxiliary trigger is depressed, i. e., moved in a forward direction or counterclockwise about its pivot 62, it will move the electrode holder forwardly a predetermined amount. This is preferably accomplished by bifurcating the upper end of the auxiliary trigger to form two upward extensions 63 and 64 (Figs. 3 and 4) separated by an intervening slot or space 65. The projections 63 and 64 straddle a pin 66 projecting rearwardly from a collar 67 fixedly secured on the rear section 8 of the outer tube of the electrode holder. The pin is covered by a sleeve 68 of insulating material having a radially extending flange 69 at its forward end against which the forward edges of the projections 63 and 64 of the auxiliary trigger bear when the auxiliary trigger is depressed. The amount that the auxiliary trigger can be depressed depends upon the setting of an adjustable stop screw 70 carried by the auxiliary trigger. The stop screw preferably turns in an internally threaded bushing in the wall of the auxiliary trigger and which comprises an elastic stop nut 71 (see Fig. 5) having a tubular neck portion 72 which is inserted through an opening in the wall of the auxiliary trigger and its rear end then peened over as shown at 73 to clamp the bushing to the auxiliary trigger. The elastic stop nut contains a body of fibrous material 74 which engages the threads on the stop screw with enough friction to prevent the stop screw from turning except when intentionally turned by means of a screw driver or other tool. The forward end of the stop screw contacts with a portion 75 of the gun casing when the auxiliary trigger is moved to the limit of its forward movement. Thus, the stop screw and the portion 75 of the casing constitute adjustable stop means for limiting the distance that the auxiliary trigger can move in the forward direction. The auxiliary trigger is biased to its rearward normal position preferably by a spring 76 which is wound around the pivot pin 62 with one end pressing rearwardly against the auxiliary trigger and its other end pressing rearwardly against the gun casing.

The upper end of the auxiliary trigger thus has only a limited amount of movement in a forward direction and the amount is such that when the auxiliary trigger is depressed to the limit of its forward movement the upper end of the trigger will move the electrode holder forwardly a distance equal to the desired length of the arc gap. Thus, it will be seen that if the electrode becomes shortened so that the arc gap is undesirably increased in length, the electrode can be easily and quickly repositioned in the electrode holder to restore the arc gap to its original length by merely (1) depressing the auxiliary trigger to the limit of its forward movement while holding the gun barrel vertically with the nozzle tip 15 in contact with the work or any other horizontal surface, (2) turning the knob 26 to release the grip of the electrode holder on the electrode either before or while depressing the auxiliary trigger thereby permitting the electrode to slide down by gravity into contact with the work, (3) restoring the grip of the electrode holder on the electrode while the auxiliary trigger is still depressed, and (4) releasing the auxiliary trigger. When the electrode holder then moves back to its rearward position it will, of course, move back the same distance that it was advanced by the auxiliary trigger, and since the end of the electrode was caused to be in contact with the work at the beginning of this rearward movement of the electrode holder the length of the arc gap in the rearward portion of the electrode holder will be equal to the distance that the electrode holder moves back to its retracted position and hence the distance that it was moved forwardly by the auxiliary trigger. When the amount of movement to which the auxiliary trigger is limited when depressed is determined by adjustable stop means such as the adjustable stop screw above described, it is apparent that the length of the arc gap will depend upon the setting of the adjustable stop means, and thus the gap may be made any desired length within certain limits. Of course, the auxiliary trigger may be used to facilitate proper positioning of a new electrode in the electrode holder to produce an arc gap of the desired length even before any shortening of the electrode has occurred, and may also be used to increase rather than decrease the length of the arc gap by seeing to it that the chuck has been loosened at the time the auxiliary trigger is depressed so that the electrode may be pushed back into the electrode holder the necessary amount when the auxiliary trigger is depressed and the electrode contacts with the work.

Thus, the auxiliary trigger constitutes simple and inexpensive built-in means for facilitating the adjustment of the electrode in the electrode holder, without the use of a separate gauge, to produce an arc gap of the desired length either after the electrode has become shorter through use or when a new electrode is positioned in the holder or at any other time.

While the invention is particularly useful in connection with an arc spot welding gun or other apparatus for arc spot welding and has been described in its application to that particular type of welding apparatus, it is also applicable to arc welding apparatus when not used for spot welding. For instance, means of the kind contemplated by the invention for moving the electrode holder forwardly a definite distance equal to the desired length of the arc gap may be used on any electrode holder that is advanceable and retractable with respect to some kind of a support that when in welding position, and when the electrode holder is in its fully retracted position, will hold the tip of the electrode spaced a fixed distance from the work during the welding operation to form an arc gap, regardless of whether some part of the support, such as a gas nozzle, is held in contact with the work while welding.

I claim:

1. In apparatus for arc spot welding, an electrode holder, a non-consuming electrode releasably gripped thereby, a support in which the electrode holder is slidably mounted and having an end to be held against the work during a welding operation, means for advancing the electrode holder in the support to bring the end of the electrode in contact with the work when said end of the support is held against the work, means for retracting the electrode holder, stop means limiting the rearward movement of the electrode holder in the support, and manually movable auxiliary means operable independently of said advancing and retracting means for moving the electrode holder forwardly in the support, said manually movable means having a limited amount of movement in one direction and serving when moved to the limit of its movement in said direction to move the electrode holder forwardly a distance equal to the desired length of the arc gap whereby when the electrode holder is moved said distance by said auxiliary means while the end of the support is held against a flat surface and the electrode is then adjusted in the holder to contact with such surface it will produce an arc gap of said desired length when the electrode holder is moved to its fully retracted position.

2. In apparatus for arc spot welding, an electrode holder, a non-consuming electrode releasably gripped thereby, a support in which the electrode holder is slidably mounted and having an end to be held against the work during a welding operation, means for advancing the electrode holder in the support to bring the end of the electrode in contact with the work when said end of the support is held against the work, spring means for retracting the electrode holder, stop means limiting the rearward movement of the electrode holder in the support, and manually movable auxiliary means operable independently of said advancing means for moving the electrode holder forwardly in the support, said manually movable means having a limited amount of movement in one direction and serving when moved to the limit of its movement in said direction to move the electrode holder forwardly a distance equal to the desired length of the arc gap whereby when the electrode holder is moved said distance by said auxiliary means while the end of the support is in contact with a flat surface and the electrode is then adjusted in the holder to contact with such surface it will produce an arc gap of said desired length when the electrode holder is moved to its fully retracted position by said spring means.

3. In apparatus for arc spot welding, an electrode holder, a non-consuming electrode releasably gripped thereby, a support in which the electrode holder is slidably mounted and having an end to be held against the work during a welding operation, means for advancing the electrode holder in the support to bring the end of the electrode in contact with the work when said end of the support is held against the work, means for retracting the electrode holder, stop means limiting the rearward movement of the electrode holder in the support, manually movable auxiliary means operable independently of said advancing and retracting means and serving when moved to the limit of its movement in one direction to move the electrode holder forwardly a predetermined amount in the support, and means for adjusting the distance that said auxiliary means can move in said direction whereby such distance may be made to equal the desired length of the arc gap and whereby when the electrode holder is moved said distance by said auxiliary means while the end of the support is held against a flat surface and the electrode is then adjusted in the holder to contact with such surface it will produce an arc gap of said desired length when the electrode holder is moved to its fully retracted position.

4. In apparatus for arc spot welding, a barrel, a pistol grip connected to the barrel, an electrode holder slidably mounted in the barrel, a non-consuming electrode releasably gripped by the electrode holder, said barrel having a nozzle attached to it the tip of which may be held against the work during a welding operation, a trigger on the pistol grip, means including said trigger for advancing the electrode holder in the barrel to bring the end of the electrode in contact with the work when the tip of the nozzle is held against the work, means for retracting the electrode holder, stop means for limiting the rearward movement of the electrode holder in the barrel, a lever pivotally mounted with respect to the barrel for moving the electrode holder forwardly in the barrel, said lever being manually operable independently of said trigger and having a limited amount of movement in one direction, the lever serving when manually moved to the limit of its movement in said direction to move the electrode holder toward the nozzle end of the barrel a distance equal to the desired length of the arc gap when the electrode holder is in its fully retracted position.

5. In apparatus for arc spot welding, a barrel, a pistol grip connected to the barrel, an electrode holder slidably mounted in the barrel, a non-consuming electrode releasably gripped by the electrode holder, said barrel having a nozzle attached to it the tip of which may be held against the work during a welding operation, a trigger on the pistol grip, means including said trigger for advancing the electrode holder in the barrel to bring the end of the electrode in contact with the work when the tip of the nozzle is held against the work, means for retracting the electrode holder, stop means for limiting the rearward movement of the electrode holder in the barrel, a lever pivotally mounted with respect to the barrel for moving the electrode holder forwardly in the barrel, said lever being manually operable independently of said trigger, the lever serving when manually moved to the limit of its movement in one direction to move the electrode holder a predetermined amount toward the nozzle end of the barrel, and adjustable stop means for adjusting the distance that said lever can move in said direction whereby the distance that the electrode holder is advanced by said lever may be made equal to the desired length of the arc gap when the electrode holder is in its fully retracted position.

6. In apparatus for arc spot welding, a barrel, a pistol grip connected to the barrel, an electrode holder slidably mounted in the barrel, a non-consuming electrode releasably gripped by the electrode holder, said barrel having a nozzle attached to it the tip of which may be held against the work during a welding operation, a main trigger on the pistol grip, means including said main trigger for advancing the electrode holder in the barrel to bring the end of the electrode in contact with the work when the tip of the nozzle is held against the work, means for retracting the electrode holder, stop means limiting the rearward movement of the electrode holder in the barrel, and an auxiliary gap adjusting trigger having a limited amount of movement in one direction and serving when moved to the limit of its movement in said direction to move the electrode holder toward the nozzle end of the barrel a distance equal to the desired length of the arc gap when the electrode holder is in its fully retracted position.

7. In a portable hand gun for arc spot welding having an electrode holder slidably mounted in the barrel which releasably grips a non-consuming electrode, and further having a nozzle attached to the barrel the tip of which may be held against the work during a welding operation, a main trigger, means for advancing the electrode holder in the barrel when the trigger is pulled to bring the end of the electrode in contact with the work when the tip of the nozzle is held against the work, means for retracting the electrode holder, and stop means limiting the rearward movement of the electrode holder in the barrel, the combination therewith of an auxiliary gap adjusting trigger having a limited amount of movement in one direction and serving when moved to the limit of its movement in said direction to move the electrode holder toward the nozzle end of the barrel a distance equal to the desired length of the arc gap when the electrode holder is in its fully retracted position.

8. In a portable hand gun for arc spot welding having an electrode holder slidably mounted in the barrel which releasably grips a non-consuming electrode, and further having a nozzle attached to the barrel the tip of which may be held against the work during a welding operation, a main trigger, means for advancing the electrode holder in the barrel when the trigger is pulled to bring the end of the electrode in contact with the work when the tip of the nozzle is held against the work, means for retracting the electrode holder, and stop means limiting the rearward movement of the electrode holder in the barrel, the combination therewith of an auxiliary gap adjusting trigger serving when moved to the limit of its movement in one direction to move the electrode holder toward the nozzle end of the barrel, and adjustable stop means for adjusting the distance that the auxiliary trigger can move in said direction whereby the distance that the auxiliary trigger advances the electrode holder may be made to equal the desired length of the arc gap when the electrode holder is in its fully retracted position.

9. In apparatus for arc welding, an electrode holder, a non-consuming electrode releasably gripped in the forward end thereof, a support for the electrode holder relative to which the electrode holder is longitudinally movable, stop means limiting the rearward movement of the electrode holder relative to the support, spring means biasing the electrode to the limit of its rearward movement, said support serving when in welding position and when the electrode holder is in its rearward position to hold the tip of the electrode spaced from the work to form an arc gap, and manually movable means having engagement with the electrode holder for moving the electrode holder forwardly relative to the support, said manually movable means having a limited amount of movement in one direction and serving when moved to the limit of its movement in said direction to move the electrode holder forwardly a distance equal to the desired length of the arc gap whereby when the electrode holder is moved said distance by said manually movable means while the support is in said welding position and the electrode is then adjusted in the holder to contact with the work it will produce an arc gap of said desired length when said manually movable means allows the electrode holder to be returned to its rearward position by said spring means.

JOSEPH M. TYRNER.

REFERENCES CITED

The following references are of record in the file of this patent:

UNITED STATES PATENTS

| Number | Name | Date |
|---|---|---|
| 2,510,415 | Pitcher | June 6, 1950 |